(12) United States Patent
Bergman et al.

(10) Patent No.: US 10,765,237 B2
(45) Date of Patent: Sep. 8, 2020

(54) LIGHTING SYSTEM AND METHOD

(71) Applicant: SIGNIFY HOLDING B.V., Eindhoven (NL)

(72) Inventors: Anthonie Hendrik Bergman, Nuenen (NL); Jochen Renaat Van Gheluwe, Lommel (BE); Berent Willem Meerbeek, Veldhoven (NL); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/490,619

(22) PCT Filed: Feb. 26, 2018

(86) PCT No.: PCT/EP2018/054683
§ 371 (c)(1),
(2) Date: Sep. 3, 2019

(87) PCT Pub. No.: WO2018/158193
PCT Pub. Date: Sep. 7, 2018

(65) Prior Publication Data
US 2020/0000250 A1    Jan. 2, 2020

(30) Foreign Application Priority Data

Mar. 2, 2017  (EP) .................................. 17158803

(51) Int. Cl.
*H05B 39/04*   (2006.01)
*H05B 41/00*   (2006.01)
(Continued)

(52) U.S. Cl.
CPC ............... *A47F 11/10* (2013.01); *F21S 10/00* (2013.01); *F21V 5/008* (2013.01); *F21V 5/048* (2013.01);
(Continued)

(58) Field of Classification Search
CPC ............ H05B 33/0815; H05B 33/0818; H05B 41/2828; H05B 41/3921; H05B 41/3927;
(Continued)

(56) References Cited

U.S. PATENT DOCUMENTS

| | | | |
|---|---|---|---|
| 2,136,429 A | 11/1938 | Forsyth | |
| 2007/0272841 A1* | 11/2007 | Wiklof | G01S 7/4817 250/234 |

(Continued)

FOREIGN PATENT DOCUMENTS

| | | |
|---|---|---|
| GB | 322833 A | 12/1929 |
| IL | 92038 A | 7/1990 |
| WO | 2017182512 A1 | 10/2017 |

*Primary Examiner* — Minh D A
(74) *Attorney, Agent, or Firm* — Meenakshy Chakravorty

(57) ABSTRACT

The invention provides a lighting system (10) for generating a configurable spotlight effect adapted to direct the attention of an individual from an initial location (34) to a defined second location (36). In particular, the invention comprises a presence detector (14) for detecting motion of an individual (22) at a detection location (28) within a detection area, and for detecting in which direction the individual (22) is moving. A configurable light source (12) is controlled by a controller (18) to create a light effect (30, 32) from a first location (34) in front of the individual (22) based on the direction of the individual (22) toward a defined location (36) so as to thereby draw the attention of the user toward said defined location.

15 Claims, 9 Drawing Sheets

(51) Int. Cl.
*A47F 11/10* (2006.01)
*F21S 10/00* (2006.01)
*F21V 5/00* (2018.01)
*F21V 5/04* (2006.01)
*F21V 23/04* (2006.01)
*G06F 3/01* (2006.01)
*H04L 12/28* (2006.01)
*F21Y 115/10* (2016.01)
*F21W 111/023* (2006.01)
*F21W 131/405* (2006.01)

(52) U.S. Cl.
CPC .......... *F21V 23/0471* (2013.01); *G06F 3/013* (2013.01); *H04L 12/282* (2013.01); *F21W 2111/023* (2013.01); *F21W 2131/405* (2013.01); *F21Y 2115/10* (2016.08)

(58) Field of Classification Search
CPC .. H05B 41/28; H05B 37/029; H05B 33/0803; H05B 37/0254; H05B 37/02; H05B 41/2855; H05B 41/386; H05B 41/2882; Y02B 20/202; Y02B 20/204
See application file for complete search history.

(56) References Cited

U.S. PATENT DOCUMENTS

| | | |
|---|---|---|
| 2010/0007601 A1 | 1/2010 | Lashina et al. |
| 2010/0277333 A1 | 11/2010 | Van De Sluis et al. |
| 2010/0315390 A1 | 12/2010 | Bergman et al. |
| 2011/0063442 A1 | 3/2011 | Aarts et al. |
| 2011/0128223 A1 | 6/2011 | Lashina et al. |
| 2013/0249410 A1 | 9/2013 | Thompson |
| 2013/0265854 A1* | 10/2013 | Hersey .................. B25J 9/1676 367/99 |
| 2015/0310657 A1 | 10/2015 | Eden |
| 2016/0055491 A1 | 2/2016 | Bulut et al. |
| 2016/0342836 A1* | 11/2016 | Hanna ................ G06K 9/00604 |
| 2019/0104596 A1 | 4/2019 | Den Hartog et al. |

* cited by examiner

LIGHTING SYSTEM AND METHOD

CROSS-REFERENCE TO PRIOR APPLICATIONS

This application is the U.S. National Phase application under 35 U.S.C. § 371 of International Application No. PCT/EP2018/054683, filed on Feb. 26, 2018, which claims the benefit of European Patent Application No. 17158803.1, filed on Mar. 2, 2017. These applications are hereby incorporated by reference herein.

FIELD OF THE INVENTION

This invention relates to a lighting system and method for generating a configurable spotlight effect, in particular a configurable spotlight effect for attracting the attention of an observer.

BACKGROUND OF THE INVENTION

Lighting can play an important role in determining how people look at objects and items in a space, and in particular in determining which items or objects a person is drawn to look at within a busy display environment. The rising prevalence of smart phones introduces a major competitor for individuals' attention, so that it can be difficult to engage the attention of individuals, even with the most attractively displayed and illuminated items.

This problem may have particular relevance for instance within retail environments such as shopping centres or streets, where individuals may walk past carefully presented shop window displays due to absorption in their mobile devices. Other areas of relevance may include museums or galleries, where it can be difficult to guide the attention of individuals to the most relevant works or exhibits.

US 2011/0128223 discloses a method allocating at least one first target and at least one second target in a display area; attracting the user's gaze towards a first target by illuminating the first target and observing the user's head to obtain a first head orientation measurement value. The method further comprises the steps of subsequently attracting the user's gaze towards a second target by illuminating the second target and observing the user's head to obtain a second head orientation measurement value; and analyzing the head orientation measurement values to obtain a head-motion/gaze relationship for that user.

US 2011/0063442 discloses an interaction system and method in which the attention of an individual is directed to certain displayed items by generating an appropriate soundscape and lighting in response to detection by the system of some interest from the individual in the displayed item. The system is designed to monitor actions and gestures of a user which may indicate interest in certain items and to generate lighting and sounds in dependence upon those actions and gestures.

However, the system is reliant in its approach upon detection of some initial engagement and interest from the user with the items on display. Without this initial interest, the system is unable to determine the appropriate light display to create to effectively engage the user. The system is unable to initially attract the attention of a user who is otherwise engaged or distracted.

There is therefore a need for a lighting system able more effectively to engage and attract attention of individuals toward desired locations of interest.

SUMMARY OF THE INVENTION

The invention is defined by the claims.

According to an aspect of the invention, there is provided a lighting system adapted to generate a configurable spotlight effect, comprising: a configurable light source arrangement for generating the configurable spotlight effect; a presence detector for detecting motion of an individual at a detection location within a detection area, and for detecting in which direction the individual is moving; and a controller adapted to determine a first location in front of the individual based on the direction of the individual, configure the configurable light source arrangement in response to said presence detector, wherein the controller is adapted to generate a light effect with the configurable light source arrangement from a first location in front of the individual towards a defined location such as to attract the attention of said individual to the defined location.

Embodiments of the invention are hence based on use of a presence detector to identify the presence of an individual at a particular location. A light effect is then created from a location proximal to the detection location toward a second location at which it is desired the user's attention is drawn. The controller may be configured to (only) create the light effect when the user's attention is not (yet) focused on the second location. The controller may, for instance, determine that the user's attention is not (yet) focused on the second location based on the direction of the motion of the user relative to the second location and/or based on a gaze direction of the user. The key concept of the invention is that of creating a light effect which extends from a location known to be proximal to the location of a user and toward the location of interest, thus actively drawing the attention of the user away from their initial region of focus and along a path which extends toward the desired target location.

In particular examples, the first location proximal to the detection location might be a location selected at a preset distance away from the detection location. In particular, this pre-set distance could be configured as approximately the distance away that a person tends to look as they walk forwards when not actively focussing on anything in their immediate environment. The set distance may in other examples map onto the region toward which a person's peripheral vision is directed when they are engaged in looking at a mobile phone, for instance just in front of them on the floor. In this way, the light effect may be configured to begin or extend from a point which it is estimated or known a user is likely already to be looking or engaged as the light effect begins. The light effect may then be created so as to extend either statically or dynamically along a path from that initial estimated region of focus toward a new target region of interest, said path drawing the attention or gaze of the individual away from their initial region of interest to a new region of interest.

In accordance with at least one set of embodiments, the system may further comprise a gaze detection means, and wherein the controller is configured to: control the gaze detection means to identify a field of view of said individual; and generate said light effect such that said first location is within said determined field of view.

Hence in accordance with these embodiments, the system is configured to determine or estimate a current field of view of an individual based upon analysis of their gaze characteristics. It can then be ensured that the light effect extends from a location within this field of view, thereby better ensuring initial attraction of user's attention such that it can be drawn successfully toward the desired location of interest (the defined location).

In particular examples, the gaze detection means may determine a direction of an individual's gaze, and subsequently determine an estimated field of view based upon the determined gaze direction. The field of view may be determined locally by the gaze detection means, or may be determined by the controller based on signal outputs from the gaze detection means.

Optionally the gaze detection means may be comprised by the presence detector.

In accordance with at least one set of embodiments, said presence detector is for identifying the presence of an individual at any detection location within a field of view of said detection area. The presence sensor may identify the location at which said individual is sensed as being present and communicate this to the controller for use in generating the light effect.

In accordance with one or more examples, the presence detector may be a motion sensor adapted to detect and identify motion of an individual within a detection area of the sensor. The motion sensor may be adapted to identify a direction and/or speed of motion in accordance with one or more particular examples. The motion sensor may be adapted to detect the direction of the motion of the individual relative to the defined location and/or the detection area. The controller may be further adapted to determine the position of first location relative to the individual based on the direction and/or the current position of the individual. In embodiments, the controller may be configured to generate the light effect (only) when the direction of the individual is (substantially) parallel to or away from a region of interest (e.g. a display area wherein the defined location is located).

In accordance with particular examples, the presence detector may be a position tracker for tracking a changing location of an individual within said detection area. The controller may be adapted to recurrently reconfigure the controllable light source in response to the changing detection location. In this way it may be ensured that the light effect continues to extend from a location at which the attention of an individual is likely to be directed, despite the movement of the individual through the detection area.

This embodiment may be combined with the feature of gaze detection, such that the light effect is maintained always within a determined field of view of the individual.

In accordance with at least one set of embodiments, the configurable light source arrangement may comprise an array of individually addressable LEDs, each arranged to produce a luminous output, and a lens arrangement common to said individually addressable LEDs, wherein the lens arrangement redirects the luminous outputs of said LEDs as a function of their position within the array.

Such an arrangement enables generation of a highly efficient spot in which the spot dimension, direction and shape can be varied without mechanical parts, simply by selective switching of different of the LEDs. The lens arrangement is configured to process the luminous outputs emitted by the active LEDs into a spot beam, where the direction and dimension of the spot is simply a function of the particular LEDs which are activated. Since there are no mechanical parts, wear and tear is significantly diminished, and additionally beam direction can be changed at a rate significantly faster than in the case of mechanically operated beam steering.

More particularly, the configurable light source arrangement may comprise: a planar array of individually addressable sets of light sources, each set comprising at least one light source, each of said light sources being arranged to produce a luminous output; and an optical system comprising a plurality of refractive lenses common to the individually addressable light sources and sequentially arranged along a common optical axis to shape the luminous output of each set of light sources into a spotlight and project said spotlight in an angular direction that is a function of a position of said set in the array.

This configurable light source arrangement is based on the recognition that an arrangement of refractive lenses that are common to all light sources of a planar array, which light sources preferably are solid state lighting elements such as LEDs, may be used to optically process the respective luminous outputs of the light sources such that each luminous output is projected in a different direction, i.e. a direction that is a function of the position of the set of light sources within the planar array.

Consequently, a particularly compact lighting arrangement is achieved that can generate dynamically adjustable spotlights. These spotlights are adjustable not just in terms of position or direction of the spotlight but also in terms of the spotlight shape by intelligent addressing of one or more sets of the light sources of the light source arrangement. Such an arrangement may be manufactured using only a few (optical) components, reducing cost and complexity of fabrication.

Such an optical arrangement provides a highly configurable spotlight source, capable of a wide range of different spotlight patterns and sizes (including multiple individual beams at once) which can be controlled to move at high speed and/or in complex patterns with little complexity of control or mechanical manipulation. This thus renders them highly advantageous in the context of the claimed lighting system, wherein the ability to direct a focussed light source with precision to varying specific locations (and potentially at speed) is of advantage in order to ensure that the attention of an individual can be attracted at a range of different detection locations by projection into any of a wide range of different estimated or detected fields of view.

Moreover, an individual's field of view may change very quickly as they move their head to look in a different location, in which case a light source arrangement capable of shifting the spotlight direction very quickly is of great advantage.

High speed and manoeuvrability of the spotlight is also of advantage in generating a light effect capable of directing an individual's attention away from their initial field of view, once their attention has initially been caught. A spotlight capable of following interesting or complex paths at high speed may be of particular benefit in attracting and holding an observer's attention as their field of view turns toward the defined region of interest.

In the context of the present application, a set of lighting devices includes at least one lighting device such that in some embodiments the planar array may comprise a plurality of individually addressable lighting devices, e.g. LEDs. Alternatively, each set of lighting devices may comprise a plurality of light sources, e.g. a spatial cluster of light sources such as LEDs for example such that an addressed cluster of light sources gives the appearance of a single light source to an observer, e.g. by generating a substantially continuous light spot.

Where a light source arrangement is provided as described above, preferably it may be arranged such that a respective angular deviation between projected spotlights generated from luminous outputs of different respective pairs of neighbouring light sources (60) is the same for any neighbouring pair across said planar array, such that the appearance of a smoothly altering light spot may be generated with the lighting device due to the fact that a change in the appearance and/or location of the light spot can be kept substantially constant, i.e. without substantial differences in the amount of change between generated light spots when changing the addressed set of light sources to a set of light sources neighbouring the previously addressed set of light sources.

In a particular embodiment, the plurality of refractive lenses of the arrangement described above may comprise a first refractive lens arranged to receive the respective luminous outputs from the array and at least one further refractive lens arranged to receive the luminous output of the first refractive lens, said first refractive lens having a lens body at least partially delimited by a planar surface facing the array and a convex surface opposite the planar surface, said lens body having a maximum height normal to the planar surface of at least the radius of the planar surface. Such a light source arrangement provides a particularly efficient generation of the spotlight due to the high refractive power and light capture efficiency of the first refractive lens.

The at least one further refractive lens may comprise a first further refractive lens and a second further refractive lens arranged such that the first further refractive lens is positioned in between the first refractive lens and the second further refractive lens, each of the first further refractive lens and the second further refractive lens being a plano-convex lens having its planar surface facing the array in order to effectively control the angular redirection of the luminous outputs of the sets of light sources of the planar array into the desired direction of the spotlight.

In a particular embodiment, the light source arrangement may further comprise a diffuser arranged downstream from the first refractive lens, such as between the first further refractive lens and the second further refractive lens. Such a diffuser causes a blurring of the generated spotlight, which blurring can assist in giving the appearance of a smooth transition of the spotlight between different projection locations. This is particularly advantageous in situations in which the diffusion power of the arrangement without a diffuser is not large enough to prevent such transitions from being observed as discrete transitions which may be aesthetically undesirable to observers and may deter them from maintaining attention on the spotlight for its full path toward the defined location of interest. Inclusion of a diffuser in this case allows that the transition of the spot is rather perceived as a smooth motion of the spotlight along a desired trajectory.

Such blurring further ensures that, when using multiple (sets) of light sources to generate a spotlight, the resulting spot will appear homogeneous. This allows, for instance, for smooth zooming. Alternatively, at least one of the respective optical surfaces of the first refractive lens and the at least one further refractive lens is at least partially structured to diffuse said luminous distributions in order to obtain this desired blurring.

Different light effects may be formed by the lighting system for directing the attention of the observer from the first location to the defined location. In a first set of embodiments, the light effect may comprise a static light pattern extending spatially from said first location proximal to the detection location toward said defined location. This may for instance be a line or bar extending from the first location to the defined location. The line or bar may be a solid, continuous line or bar or a broken line or bar.

Additionally or alternatively, in accordance with at least one set of embodiments, a dynamic light effect may be generated comprising a spot beam controlled to move along a path from said first location proximal to the detection location toward said defined location. Such a dynamic beam may in some contexts be more effective at directing attention toward a desired location, since its dynamic nature may be intrinsically more stimulating or attention-grabbing. The configurable light source arrangement described above is particularly suited to the generation of dynamic and adaptable precision beams which may enable a range of different dynamic light effects to be created. By providing a moving beam, it can be better ensured that a user's gaze is guided or drawn along a path from their initial point of focus to the defined location. By contrast, with a static pattern, a transition of observer focus toward the defined location is more difficult to effect.

In accordance with one or more embodiments, the light effect may be at least partially formed by a coded light output encoded with information. The coded light output may take the form of a projected light output being patterned in such a way as to encode information. The coded light outputs may be configured such that the information can be extracted by scanning or capturing the projected code using a suitable imaging device and decoder (such as with a smart mobile device being equipped with an appropriate app). The light output may be encoded for instance with product information or with a promotion link or code for example. The coded light outputs may in accordance with example embodiments be part of an interactive game like experience in which a user is tasked with 'collecting' a number of light codes. This may add an element of interactivity which may better enable attraction and maintenance of an individual's attention as they are guided toward the defined location of interest.

In accordance with one or more example embodiments, the light effect may include light effect regions at each of said first location and said defined location, and wherein the light effect region at said first location is controlled so as to share one or more optical properties with the light effect region at said defined location so as to associate the two locations and attract the attention of an individual from the first location toward the defined location. The light effect regions at each location are hence controlled to resemble one another so as to evoke an association between them. This effect may be in addition to the primary aspects of the light effect in which a light effect extends from the first location to the defined location so as to guide attention of an observer from one toward the other.

In examples, the optical properties may include a colour of the light effect region, a shape of a light pattern or effect generated at each region, a size of a light pattern or effect at each region or an intensity of the light effect at each region. Additionally, the optical properties could include a temporal pattern of illumination of the region, for instance wherein the two light effect regions are controlled to flash synchronously with one another so as to associate the two and attract attention from one to the other.

Examples in accordance with a further aspect of the invention provide a method for generating a configurable spotlight effect, comprising: detecting motion of an individual at a detection location within a detection area; detecting in which direction the individual is moving; determining a first location in front of the individual based on the direction of the individual; and in response to said detection, configuring a configurable light source arrangement to generate a light effect from the first location towards a defined location so as to attract the attention of said individual to the defined location.

In accordance with at least one set of embodiments, the method may further comprise controlling a gaze detection means to identify a field of view of said individual and generating said light effect such that said first location is within said determined field of view. The gaze detection means may optionally be comprised by the presence detector.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a lighting system for generating a configurable spotlight effect adapted to direct the attention of an individual from an initial location to a defined second location. In particular, the invention comprises a presence detector for detecting the presence of an individual at a detection location. A configurable light source is controlled by a controller to create a light effect from a first location proximal to said detection location toward a defined location so as to thereby draw the attention of the user toward said defined location.

Figure 1:
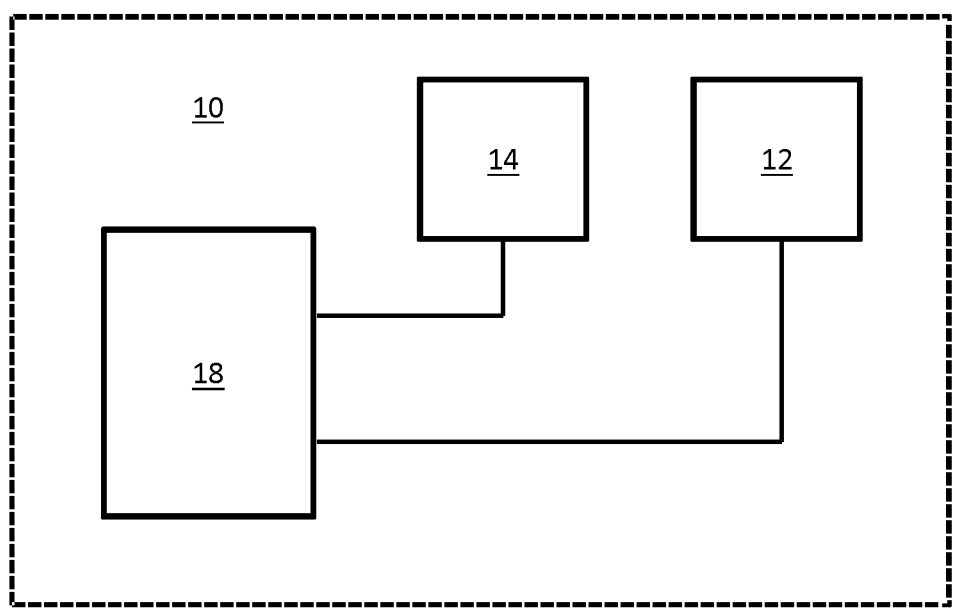
FIG. 1 depicts a block diagram of an example lighting system in accordance with an embodiment of the invention.

FIG. 1 shows a block diagram illustrating a first example lighting system 10 in accordance with an embodiment of the invention. The lighting system comprises a configurable light source arrangement 12 for generating a configurable spotlight and a presence detector 14 for detecting the presence of an individual in a detection location. The configurable light source arrangement and the presence detector are each operatively coupled to a controller 18 adapted to configure the configurable light source arrangement in response to an output from the presence detector. The controller is in particular adapted to configure the light source arrangement to generate a light effect from a first location proximal to the detection location towards a further defined location so as to attract the attention of the detected individual toward said defined location.

Figure 2:
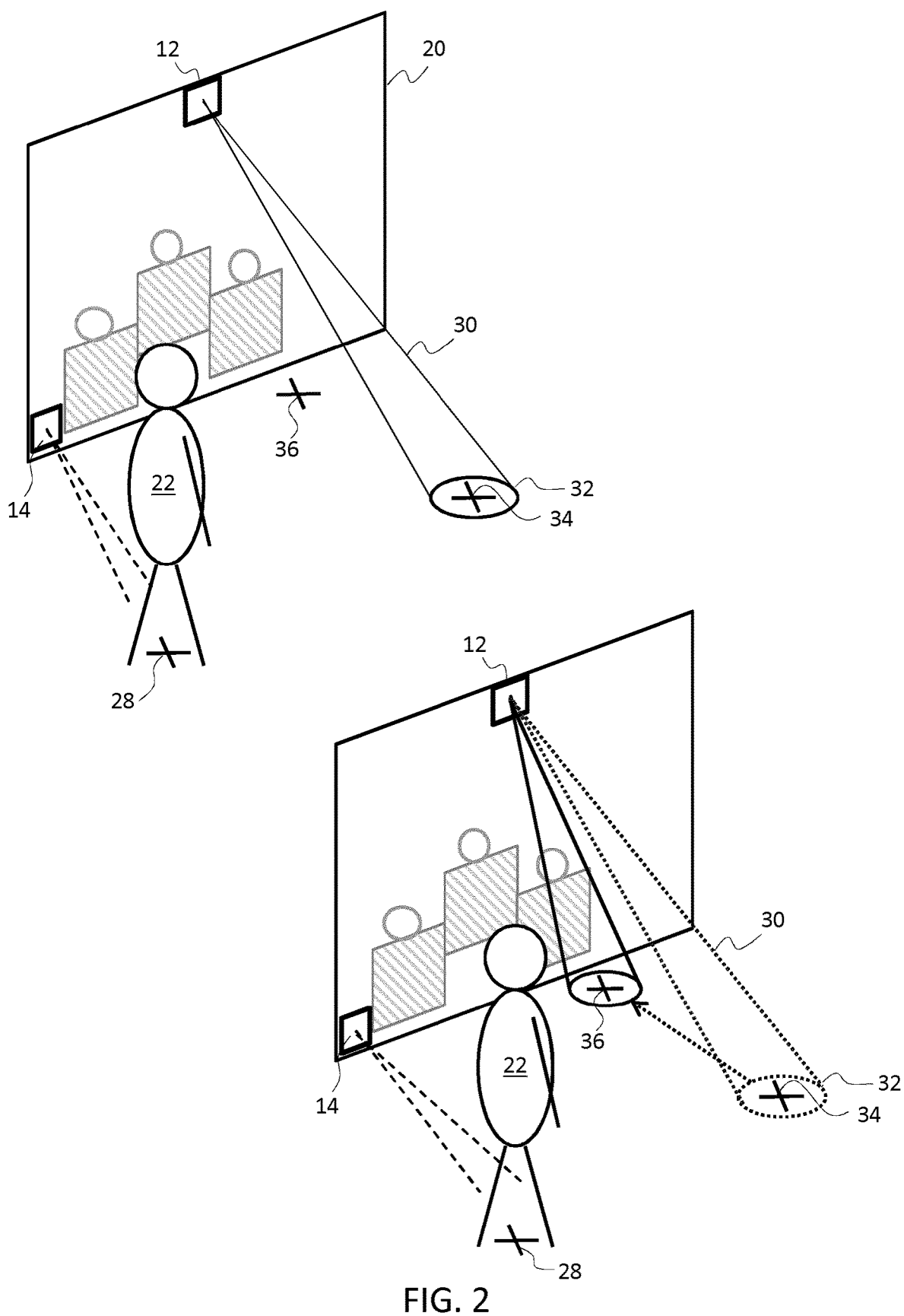
FIG. 2 schematically depicts operation of the example lighting system of FIG. 1.

FIG. 2 schematically depicts, by way of an illustrative example, the functional operation of the system. The system 10 is shown configured, by way of example, within a retail environment, wherein the configurable light source arrangement 12 and presence detector 14 are installed within the window 20 of a shop for attracting the attention of an individual 22 toward one or more items displayed in said shop window.

It is noted that the particular installation arrangement shown in FIG. 2 is by way of non-limiting illustration only, and in further examples, the particular installation locations of the configurable light source arrangement 12 and presence detector 14 may vary. For example, these units may be located outside of the shop window, on the ceiling, on the floor or any other location suitable for performing the function of generating the light effect and detecting the presence of the individual respectively. The functionality of the lighting system is not dependent upon any particular spatial configuration of the components, and the components may in general be arranged in accordance with any configuration suitable for realising the light effect and detecting the individual.

Referring again to the example of FIG. 2, as an individual 22 walks in the vicinity of the shop window 20, the presence detector 14 detects their presence in a detection location 28. In examples, the presence detector may be adapted to detect the presence of an individual only at one particular detection location. The presence detector may for instance comprise a break beam sensor or a narrow-field passive infrared (PIR) sensor, wherein the presence of an individual only within the path of a relatively narrow emitted beam or light output can be detected. However, in alternative examples, the presence detector may be adapted to detect the presence of an individual at any of a range or field of locations within a broader detection area. The detection sensor may be operable to detect the presence and preferably also to identify the particular location within said broader detection area at which the individual is present.

In examples, the presence detector 14 may be a motion sensor and/or a position tracker adapted to identify motion of the individual within a detection area of the sensor and/or track the moving position of an individual 22 within a broader detection area. In the latter case, the changing location may be frequently relayed to the controller 18 and utilised to adjust the light effect accordingly so as to continue to extend from or begin at a point being proximal to the individual.

The presence detector 14 may be adapted to detect the direction of the motion of the individual relative to the defined location 36 and/or the detection area. The controller 18 may be further adapted to determine the first location relative to the individual based on the direction and/or the current position of the individual. In embodiments, the controller may be configured to generate the light effect (only) when the direction of the individual is (substantially) parallel to or away from a region of interest (e.g. a display area wherein the defined location is located).

By 'proximal' is meant more particularly within at least an estimated field of view of the individual, so that the light effect can be seen by the individual. This generally requires knowing at least in which direction the individual is facing, so that the first location 34 proximal to the detection location 28 can be selected so as to at least be in front of the individual, rather than for example behind them.

In the absence of any dedicated means for assessing the orientation of the individual, a likely field of view may be implicitly derived from a detected direction of motion of the individual. This may be achieved for example by use of a motion sensor or position tracker as described above, wherein such a sensor or tracker is adapted so as to identify at least a direction of motion of the individual. The field of view may for example be assumed to lie within an area being a preset distance away from the user, in a direction parallel with said detected direction of motion.

In accordance with any of the above examples, upon detecting the presence of an individual 22 at a detection location 28, the presence sensor 14 is adapted to communicate said detection to the controller 18. In response to the detection, the controller is adapted to configure the configurable light source arrangement 12 to generate a light effect 30 from a first location 34 proximal to the detection location 28 to a further defined location 36. The defined location may be a location proximal to or coincident with a particular object or region of interest towards which it is desired that the individual 22 turn their attention. In the illustrated example of FIG. 2, the defined location 36 is selected as a location immediately in front of an object displayed in the shop window 20.

The generated light effect in the illustrated example consists of a configurable spot beam 30 projected onto a surface of the space in front of the individual 22 coincident with a selected first location 34 proximal to the detection location 28. The projected beam 30 creates a light spot 32 at said location, the location being for example at a point on the floor, on a wall, on the ceiling or on any other surface within the space. Although a simple circular spot is shown in FIG. 2, in further examples, the light beam may be adapted to project any particular pattern, shape, image or symbol, for example an arrow indicating a direction of the defined location 36.

As illustrated in the lower drawing of FIG. 2, the configurable light source arrangement is controlled to move said light beam 32 smoothly across the space through a path extending from the first location 34 proximal to said detection location 28 to the defined second location 36 proximal to or at the region of interest at the shop window 20. This creates a light effect on the floor of the space in which the light spot 32 is observed to transition smoothly along a path from said first location to said defined location. As the light spot moves, the attention of the individual 22 should move with it, so as to follow the light effect thus redirecting the individual's attention from a point in front of them toward the defined location at which is located the object of interest.

It is preferable that the first location at which the light effect begins or extends be a location within a field of view of the individual 22. In this way it can be better ensured that the light effect succeeds in initially attracting the attention of the individual to it. Only once the individual has focussed attention on the initial light spot 32 at the first location 34 can the light effect then succeed in drawing that attention away to the defined second location 36.

In a simplest embodiment, this may be achieved by setting said first location 34 proximal to the detection location 28 to be a certain pre-set distance away from the detection location. As discussed above, it is also necessary that the detection location be in a direction away from the individual parallel with the direction in which they are facing, such that it lies within their field of view. This information may be implicitly derived for example from a detected direction of motion of the individual by the presence detector 14 in the case that the presence detector is operable to track the motion of the individual. The first location may then be set to be a preset distance away from the individual along a direction parallel with the detected direction of travel of the individual.

The magnitude of pre-set distance may in examples be calculated to accord with an average gazing distance of an individual when not looking actively at anything in their vicinity. In this way, it may be ensured that for at least a significant proportion of individuals, the light effect begins at a location within the individual's field of view.

Additionally or alternatively, the preset distance may be calculated so as to accord with the average resting distance of an individual's peripheral vision when they are focussing on a smart device (such as a smartphone) being held in front of them. By ensuring that the light effect falls within this average peripheral vision region, it may be possible to distract a user from their mobile phone and divert their attention instead toward the defined region as the light spot moves across the surface of the space.

Figure 3:
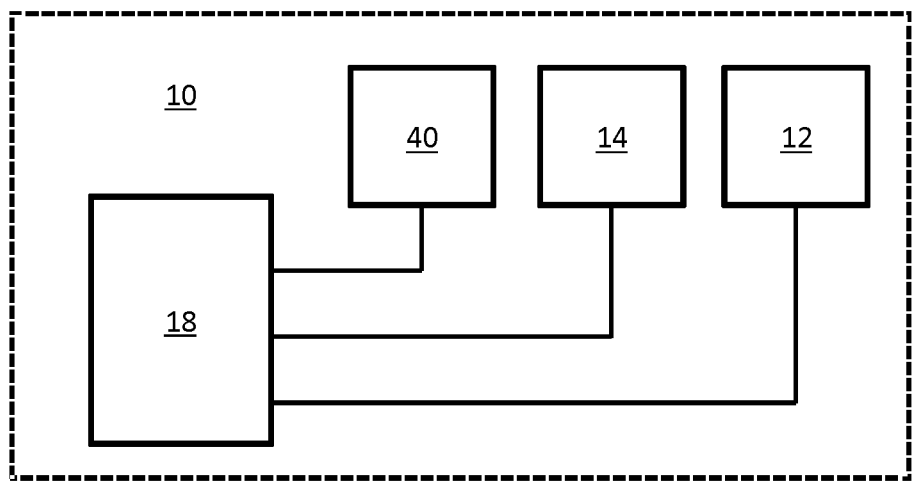
FIG. 3 depicts a block diagram of a further example lighting system in accordance with an embodiment of the invention.
Figure 4:
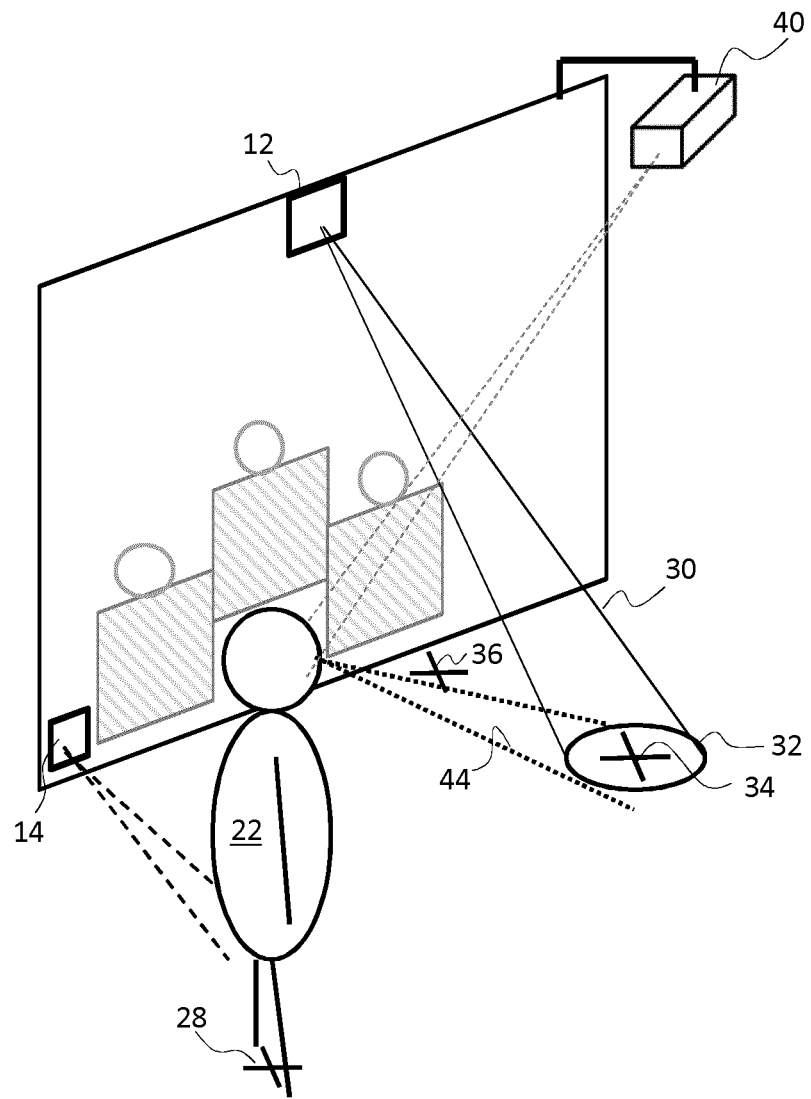
FIG. 4 schematically depicts operation of the example lighting system of FIG. 3.

In accordance with a further set of embodiments, the effect may be realised with greater reliability through use of a gaze detection means to detect and/or track the gaze of an observer. FIG. 3 shows a block diagram illustrating an example lighting system 10 in accordance with such an embodiment. The lighting system is the same its configuration as that illustrated in FIG. 1, except for the additional inclusion of a gaze detection means 40 for detecting the gaze of an individual. FIG. 4 schematically depicts the lighting system 10 in operation, again, by way of example, within the context of a retail environment.

As in the embodiment of FIG. 1, the presence detector 14 is adapted to detect the presence of an individual 22 at a detection location 28. The presence detector may be in accordance with any of variations described above in relation to the embodiment of FIG. 1.

Either concurrently or in response to the detection by the presence detector 14, the gaze detection means 40 is controlled to identify a field of view 44 of the individual 22. Depending upon the functional capabilities of the gaze detection means 40, determination of the field of view may either be determined locally by the gaze detection means itself or may be determined by the controller 18 in response to signal outputs from the gaze detection means. For example, the gaze detection means may be adapted to detect only a gaze direction of the individual. Based on the detected gaze direction, the controller may then be configured to determine the estimated field of view 44 of the individual 22.

In examples, the gaze detection means may comprise an optical sensor such as a camera being controlled by the controller 18, wherein the controller is configured to implement facial recognition algorithms based upon which an orientation of the individual's eyes relative to their head may be detected, and from this, a gaze direction determined.

Once the field of view 44 of the individual 22 has been determined, the controller 18 may then configure the configurable light source 12 accordingly so as to generate a light effect 30 which begins or extends from a first point 34 which lies within this field of view. Advantageously, the first point may be selected so as to be centrally located within the estimated field of view to thereby maximise the chance of it gaining the active attention of the individual.

As noted above, increasingly it is common for an individual's attention to be engaged in a smart device (such as a mobile phone) as they are walking through a display environment such as a shopping centre. In this case, creating the light effect at a region centrally located within their field of view may not be effective, since this region of the floor (or other surface) may be obscured by the smart device being held in front of them. It may be preferable in accordance with one or more embodiments to render the light effect such that said first location is positioned at an off-centre position within the detected field of view of the individual 22, for instance positioned to correspond with their peripheral vision. In this way the light effect may still attract the individual's attention despite their being initially focussed on the smart device. A light spot for instance strategically positioned at a peripheral region of the determined field of view may succeed in distracting the individual from their smart device and encourage them to turn their attention to the determined location 36 of interest upon movement of the light spot toward said location.

The gaze detection means 40 may in accordance with some examples be adapted to track the changing gaze direction or field of view 44 of the individual 22 as the individual moves within a detection area of the gaze detection means (the detection area being simply the area of sensitivity of the gaze detection). The changing gaze direction or field of view may be communicated to the controller 18 and utilised to alter the light effect 30 so as to continue to extend from a point 34 which lies within an active field of view of the individual 22.

Although the gaze detection means 40 is provided as a separate unit in the example of FIGS. 3 and 4, in further examples, the gaze detection means may for instance be comprised by the presence detector 14 (or vice versa). The gaze detection means, in addition to determining or analysing an individual's gaze, may function to detect and/or track their position within a detection area.

In accordance with any embodiment of invention, the controller 18 may be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Some examples of suitable presence detectors 14 have been mentioned above. However, it is to be understood that in accordance with any embodiment of the invention, the presence detector may take any form being suitable for the purpose of detecting the presence of an individual in at least one detection location. Particular examples include, but are not limited to, passive infrared (PIR) sensors, proximity sensors, break-beam sensors (for instance infrared break beam sensors) or cameras (for instance utilised in combination with suitable software for identifying and/or tracking the presence of an individual within the field of view of the camera). A camera based system may in simple examples make use of well-known hardware and software means such as the Kinect movement tracking system.

In the examples illustrated above, the example light effect has consisted of a dynamic spotlight effect 30 wherein a spotlight beam 30 is controlled to move a projected light spot 32 across a space from a first point 34 proximal to the detection location 28 to a defined point of interest 36. However, in further examples, the light effect may differ. As noted above, the light source arrangement may be adapted to project a more complex pattern or shape into the space in place of the simple light spot, such as an arrow or a star. This more complex pattern may in similarity to the light spot described above be controlled to move between the first 34 and second 36 locations in accordance with the scheme of FIG. 2 or 4. The projected image or pattern may also be controlled to exhibit additional local dynamics, such as local rotation or flashing, effected for example simultaneously with motion from the first location 34 toward the defined location of interest 36.

In accordance with further embodiments, the light effect may alternatively comprise a static light pattern projected onto the floor and patterned or shaped so as to encourage the attention of the user from the first point 34 to the defined second point 36.

Figure 5:
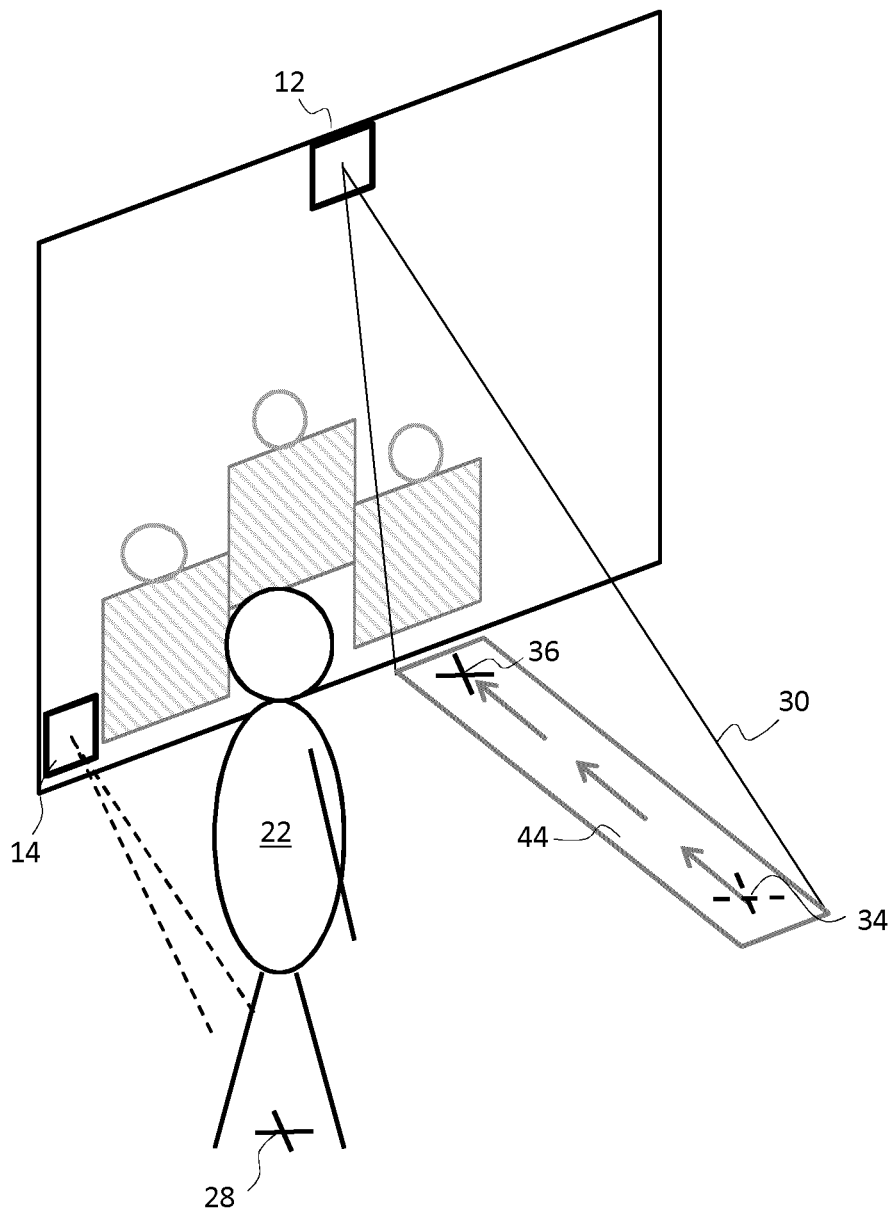
FIG. 5 schematically depicts operation of a further example lighting system in accordance with an embodiment of the invention.

An example is illustrated schematically in FIG. 5 wherein the configuration of the lighting system is the same as that of the embodiment of FIGS. 1 and 2. Upon detection of the individual 22 at the detection location 28 by the presence detector 14, the controller 18 configures the configurable light source arrangement 12 to generate a light effect 30 consisting of a projected light pattern 44 which depicts an image of a solid bar shape extending from the first point 34 proximal to the detection location to the defined second point 36. The bar may, as illustrated in FIG. 5, be patterned with symbols or indications encouraging the user to direct their attention toward the defined point of interest 36. In the illustrated example, the projected bar pattern comprises arrows pointing toward the region of interest 36.

Although the projected light pattern 44 shown in FIG. 5 consists by way of example of a solid bar, it may include or consist of any pattern or shape being suitable for directing the attention of the individual 22. It may be a line shape rather than a bar; the line or bar may define a non-straight path; the line or bar may be broken rather than continuous. The broken or solid bar or line may in addition taper in width between the first location 34 and the defined location 36 so as to give an indication or impression of directionality from the first location toward the defined location.

Although a bar or line is illustrated in particular in FIG. 5, any other static light pattern suitable for directing an individual's attention toward the defined region of interest 36 may instead be used.

The configurable light source arrangement 12 may take a number of different forms. In simple examples, it may comprise a conventional spotlight projector, for instance a mechanically adjustable spotlight projector, to enable realisation of the sweeping light beam effect illustrated in FIGS. 2 and 4. For generation of a static light pattern, it may comprise a conventional digital image projector, or a conventional light pattern projector featuring changeable mask elements for the projection of different particular light patterns.

The configurable light source arrangement may, as in the examples illustrated in of FIGS. 2 and 4 be installed at an elevated height such that the light effect is projected downwards into the space in which the light effect is to be created. However, in alternative examples, the configurable light source arrangement may be at least partially incorporated within the flooring of the space, for instance as part of a dedicated floor lighting system operable to create light effects visible across the surface of the floor by projection upwards through light transmissive flooring elements. A floor mounted light source arrangement may utilise one or more configurable LED arrays to provide configurable light patterns onto the surface of the flooring. Through selective dimming of light sources in the array, both dynamic and static light effects may be generated. Such floor mounted lighting arrangements may be provided in place of, or in supplement to, an elevated spotlight unit such as that illustrated in FIGS. 2 and 4.

To maximise the flexibility of the lighting system to create a broad range of different light effects and for attracting attention between a broad range of different start 34 and end 36 locations, it is desirable that the light source arrangement 12 be as adaptive and as responsive as possible in creating different light effects.

One preferred implementation of the configurable light source will now be described in detail with reference to FIGS. 6-10.

As will be described in greater detail below, the light source arrangement under consideration is comprised of an array of individually addressable LEDs, each arranged to produce a luminous output, and a lens arrangement common to said individually addressable LEDs, wherein the lens arrangement redirects the luminous outputs of said LEDs as a function of their position within the array.

Such an arrangement enables generation of a highly efficient spot in which the spot dimension, direction and shape can be varied without mechanical parts, simply by selective switching of different of the LEDs. The lens arrangement is configured to process the luminous outputs emitted by the active LEDs into a spot beam, where the direction and dimension of the spot is simply a function of the particular LEDs which are activated. The spot created is highly directional and precise and is therefore of particular advantage in embodiments of the present invention, where it is desired to maintain the spot focussed closely within the active field of view of the individual. The direction and shape of the spot can also be adjusted at great speed, therefore enabling highly dynamic light effects to be created and enabling fast adjustment of generated light effects, for instance in response to movement of the field of view of the individual. Due to the absence of moving parts, the fast changes in the beam parameters may be effected without reducing the lifetime or reliability (as compared to using mechanically moving parts).

Figure 6:
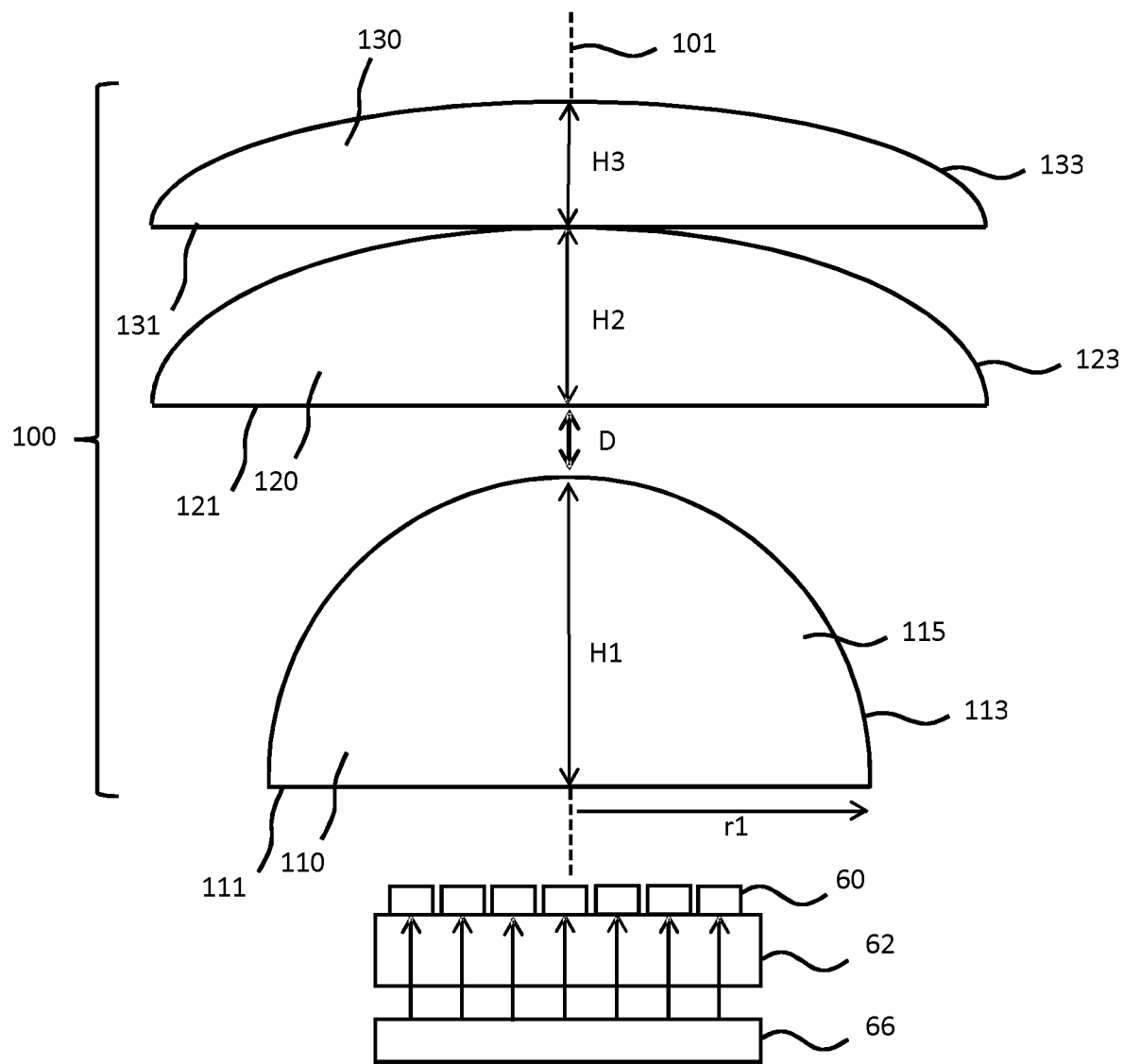
FIG. 6 schematically depicts an example configurable light source arrangement suitable for inclusion a lighting systems in accordance with one or more embodiments.

FIG. 6 schematically depicts a configurable light source arrangement 12 in accordance with a preferred embodiment. The light source arrangement 12 comprises a plurality of light sources 60 arranged in a planar array; each light source 60 is arranged to generate a luminous distribution along an optical axis, wherein the respective optical axes of the light sources 60 are aligned. In the context of the present application it should be understood that small deviations from a perfectly planar array are acceptable; for example, the array may be positioned on a slightly curved surface such that an angular spread of the angles between respective optical axes of the light sources 60 does not exceed 5°.

The light sources 60 preferably are solid-state light sources such as LEDs. The light sources 60 may be identical light sources, e.g. white light LEDs, or may be different light sources, e.g. different colour LEDs. The light sources 60 may be mounted on any suitable carrier 62 such as a printed circuit board or the like. Any suitable type of light sources 60 may be used for this purpose. Each light source 60 is controlled, i.e. addressed, by a control unit 66.

The control unit 66 of the configurable light source arrangement may interact co-operatively with the controller of the lighting system such that the two together provide effective control of the light source arrangement to realize each desired light effect. In accordance with some examples, the control unit 66 may be comprised by the primary controller 18 or indeed may be identical with the controller, such that the controller itself performs all of the functions of the control unit 66.

Where the control unit 66 is a separate unit, it may take any suitable form, such as a dedicated controller or microcontroller or a suitable processor programmed to implement the control functionality. In all references to the control unit 66 to follow, this is to be understood as referring both to the case in which a separate control unit 66 is provided and in which a control unit is integrated with or identical to the primary controller 18.

The control unit 66 may be adapted to individually address each light source 60 or may be adapted to address clusters of light sources 60. In the context of the present application, both scenarios will be referred to as the control unit 66 being adapted to address a set of light sources 60, wherein the set may have only a single member (i.e. the control unit 66 is adapted to address individual light sources 60) or wherein the set may have multiple members (i.e. the control unit 66 is adapted to address clusters of light sources 60).

In an embodiment, the light sources 60 may be arranged in clusters within the array, with each cluster defining a group of light sources 60 arranged to generate light of different colours. The light sources 60 in each cluster for example may be placed within a mixing chamber, e.g. a white mixing chamber, or may be placed underneath mixing light guide such as a glass square or PMMA rod, to generate light of a desired spectral composition. In this embodiment, the control unit 66 may be adapted to address individual light sources 60 within single clusters such that the control unit 66 may change the colour of the light generated by the cluster. In the above embodiments, the addressing of the light sources 60 with the control unit 66 may include switching the light sources 60 between an on-state and an off-state and changing a dimming level of the light sources 60.

The light source arrangement 12 is adapted to convert the luminous distributions of the addressed light sources 60 into a spotlight (i.e. a light spot) for projection onto a surface of the space within which the light effect 30 is to be generated. In a preferred embodiment, the light source arrangement 12 is a spotlight projector. The control unit 66 facilitates the dynamic adjustment of the spotlight in response either to received instructions from the primary controller 18 (where the control unit 66 is a separate unit), or signal outputs from the presence detector 14 (in the case that the control unit is comprised by or identical with the main controller 18), and utilising for example one or more pre-programmed or user-directed control schedules indicating suitable light effects to generate in response to such outputs.

Such a dynamic adjustment may include the displacement of the spotlight on the surface on which it is projected although examples of the light source arrangement 12 are not limited to spotlight migration. Spotlight adjustments may further include adjustment of the colour of the spotlight, the shape of the spotlight or any combination of these adjustments, for instance to better attract the attention of individuals to the initial spotlight projection and subsequently to the defined region of interest 36.

It is further noted for the avoidance of doubt that the light source arrangement 12 may be adapted to simultaneously create multiple spotlights, with the position of each spotlight being independently dynamically adjustable as will be readily understood by the skilled person. This may be utilised in examples to enable the simultaneous attraction of multiple different individuals to potentially different defined locations of interest within the space. It may additionally or alternatively enable the creation of more interesting and varied light effects being therefore more effective in attracting and maintaining the attention of individuals as their gaze is drawn toward the region of interest 36.

Advantageously, the light source arrangement 12 does not require any moving (motorized) parts to implement the dynamic adjustment of the spotlight created with the light source arrangement 12, since the adjustment is achieved solely through the addressing of selected sets of light sources 60 with the control unit 66, as previously explained. This is achieved by the provision of an optical system 100 common to all the sets of light sources 60, which optical system 100 is arranged to receive the respective luminous distributions produced by the light sources 60 and to shape these respective luminous distributions into a spotlight having a shape and position determined by the specific set(s) of light sources 60 addressed (enabled) by the control unit 66. More specifically, the optical system 100 is adapted to project the spotlight in an angular direction relative to its optical axis 101 that is a function of the position of the addressed set of light sources 60 within the array of light sources 60.

To this end, the optical system 100 comprises a plurality of refractive lenses including a first refractive lens 110 arranged to collect the respective luminous distributions produced by the light sources 60 and at least one further refractive lens 120 arranged to collect the light exiting the first refractive lens 110. In the embodiment schematically depicted in FIG. 6, the optical system 100 comprises three plano-convex lenses 110, 120, 130 each having their planar light entry surfaces 111, 121, 131 facing the array of light sources 60 and having convex light exit surfaces 113, 123, 133 opposing their respective light entry surfaces. The plano-convex lenses 110, 120, 130 preferably are rotationally symmetric around a shared optical axis 101 and each may be made of any suitable material, e.g. glass or an optical grade polymer such as polycarbonate, poly (methyl methacrylate) (PMMA), polyethylene terephthalate, and so on. The respective lenses 110, 120, 130 may be made of the same material or of different materials, e.g. to tune the refractive index of the respective lenses 110, 120, 130.

The refractive lenses 110, 120, 130 are typically arranged to reduce the beam spread angle of the respective luminous distributions generated with the light sources 60, i.e. to increase the degree of collimation of these respective luminous distributions, in order to convert these luminous distributions into a light beam with a high degree of collimation. The luminous output of the optical system 100 are thereby processed by the optical system so as to take the shape of a spotlight when projected into the far field, i.e. at a distance several orders of magnitude greater than the focal length of the optical system 100, such as for example at a distance of 1 m, several metres or more. This is explained in more detail with the aid of FIG. 7, in which the optical function as implemented by the optical system 100 is schematically depicted.

Figure 7:
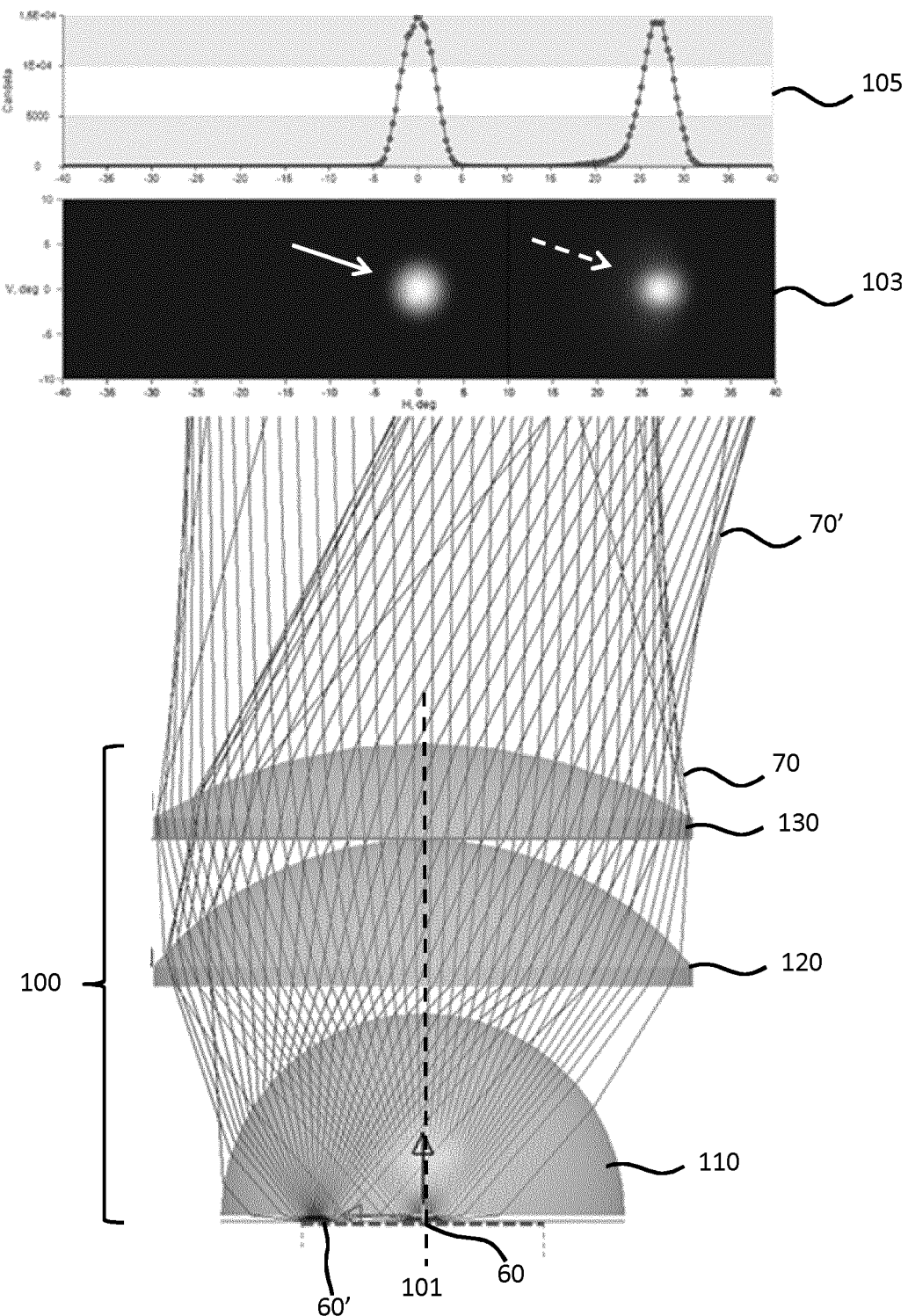
FIG. 7 schematically depicts the optical functionality of the example configurable light source arrangement of FIG. 6.

As can be seen in FIG. 7, the optical system 100 images the luminous distribution of the light sources 60 as a function of the position of the light source 60 relative to the optical axis 101 of the optical system 100. This is exemplified in FIG. 7 by reference to a first light source 60 positioned on the optical axis 101 having its luminous distribution 70 shaped (collimated) along the optical axis 101, and a second light source 60' being axially displaced relative to the optical axis 101 having its luminous distribution 70' shaped (collimated) under a non-zero angle with the optical axis 101, with the magnitude of this angle being a function of the amount of axial displacement of the light source 60 relative to the optical axis 101. The luminous distribution 70 leads to the projection of a first spotlight as indicated by the solid arrow in the pane 103 along the optical axis 101 whereas the luminous distribution 70' leads to the projection of a second spotlight as indicated by the dashed arrow in the pane 103 that is axially displaced relative to the optical axis 101. The pane 105 depicts the luminous intensity distributions of the respective spotlights in the pane 103. In this manner, by addressing selected sets of light sources 60 based on their position in the array relative to the optical axis 101, the projection direction of the spotlight generated with the optical system 100 may be controlled.

The first refractive lens 110 preferably has a height H1 of at least 0.9 times its radius r1, in order to achieve a sufficiently high refractive power. In an embodiment, the height H1 equals the radius r1, i.e. the first refractive lens 110 is a hemispherical lens. If the height H1 were to be less than 0.9 times the radius r1, the refractive power of the first refractive lens 110 would be diminish, thereby putting higher demands on the refractive power of downstream lenses of the optical system 100. This would require an increase in the size of such downstream lenses, thereby increasing the overall size of the optical system 100 and reducing its efficiency. In a further preferred embodiment, the height H1 does not exceed 1.3 times the radius r1 in order to limit the amount of internal reflection within the first refractive lens 110, which internal reflection reduces the optical efficiency of the lens. The first refractive lens 110 preferably has a diameter (2*r1) that is larger than the diameter or largest cross-section of the array of light sources 60 such that the first refractive lens 110 can collect substantially all light emitted by the light sources 60 independent of the position of each light source 60 within the array. For this reason, the planar light entry surface 111 of the first refractive lens 110 preferably is positioned as close as possible to the array of light sources 60 to maximize the optical efficiency of the optical system 100, although a small gap between the planar light entry surface 111 of the first refractive lens 110 and the array of light sources 60 may be present, e.g. a gap of about 1 mm. This gap preferably does not exceed the pitch of the light sources 60 in the array and more preferably is less than or equal to half this pitch.

Due to the fact that the light distribution exiting the first refractive lens 110 through its convex light exit surface 113 still is divergent (although to a lesser degree than the luminous distribution of the light produced by the light sources 60), the one or more refractive lenses 120, 130 have a larger diameter than the first refractive lens 110 in order to harvest substantially all light exiting the first refractive lens 110. The first further refractive lens 120 may be separated from the first refractive lens 110 by a spacing or a gap having a dimension D, which dimension D may be based on the radius r1 of the first refractive lens 110. For example, the dimension D may be up to about 0.30*r1, e.g. a spacing or gap in a range of about 6-8 mm for a first refractive lens 110 having a radius r1 of 30 mm, although alternatively this spacing or gap may be absent, i.e. the light entry surface 121 of the first further refractive lens 120 may contact the light exit surface 113 of the first refractive lens 110. The respective lenses of the optical system 100 may be spherical or aspherical. The respective heights H2, H3 of the first further refractive lens 120 and, if present, the second further refractive lens 130 may be optimized in accordance with the position of these lenses within the optical system 100 and the desired optical function of the optical system 100 as will be readily understood by a skilled person.

Figure 8:
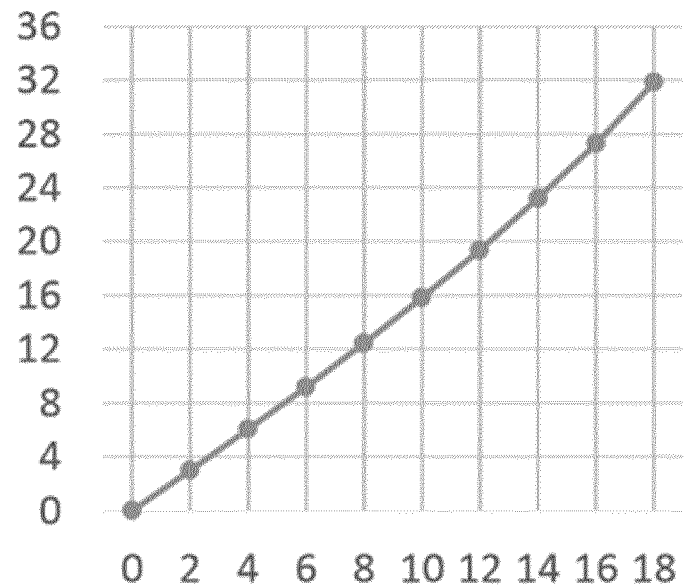
FIG. 8 is a graph depicting the angle between an optical axis of the example configurable light source arrangement and the direction in which spotlight is projected by the light source arrangement according to an embodiment as a function of light source position.

The spatial resolution of the array of light sources 60 is determined by the pitch of the light sources 60 in the array. This spatial resolution is associated with the angular resolution, i.e. 'angular pitch', in the final light distribution as determined by the optical system 100. In this context, 'angular pitch' denotes the angular difference between the final central light direction of a light source 60 after imaging by the optical system 100 as previously explained and the final central light direction of a neighbouring light source 60 in the array. This angular pitch preferably is approximately constant over the total angular range of the configurable light source arrangement 12, as schematically depicted in FIG. 8, which depicts the angle between the optical axis 101 and the final central light direction of a light source 60 (y axis) as a function of the axial displacement (x axis; units mm) of the light source 60 relative to the optical axis 101. In other words, the angular pitch on the optical axis of the spotlight is about the same as the angular pitch at the outer angular range of the spot as illustrated in FIG. 8.

Figure 9:
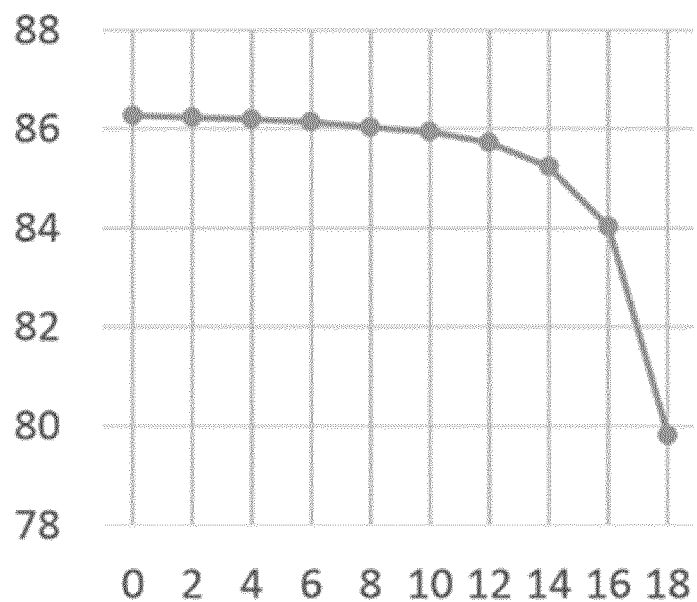
FIG. 9 is a graph depicting the optical efficiency of the configurable light source arrangement as a function of light source position.

FIG. 9 depicts the optical efficiency (y axis; %) of the generated spotlights as a function of the axial displacement (x axis; mm) of the light source 60 relative to the optical axis 101, which demonstrates that a relatively constant spotlight intensity can be generated across a large range of axial displacements of the light sources 60 relative to the optical axis 101.

In order to enable a smooth (non-discrete) apparent movement of a spotlight, the angular blur of the optical system 100 should have a diffusion angle greater than the angular pitch generated by the optical system 100. In other words, by intelligently controlling the intensity of the light sources 60 it is possible to generate a beam with a peak intensity located in between individual beam components, whereby the individual components are not distinguishable, e.g. when dynamically displacing the spotlight along a specified trajectory. Another way of looking at this is that there should be sufficient overlap between spotlights originating from neighbouring light sources 60 in the array such that the sequential addressing of such neighbouring light sources 60 gives the appearance of a smoothly transitioning spotlight across a surface on which this spotlight is projected.

A smoothly transitioning spotlight may improve the aesthetic appeal of the light effect to observers. This in turn may render it more likely that the individual will maintain focus on the spotlight throughout its entire path from an individual's initial point of focus 34 toward the defined region of interest 36. A fragmented or discretised transition motion may create a negative aesthetic effect, encouraging an observer to stop looking at the spotlight as soon as it begins moving, thus failing in drawing the attention of observers along the intended path to the desired region of interest.

The necessary control of the light sources to realise the smooth apparent movement may be expressed formulaically as follows. If the angular magnification A of the optical system 100 is approximately constant, a light source at an axial displacement r from the optical axis 101 will be imaged by the optical system 100 under an angle θ, or:

$$\theta = A \cdot r$$

If p is the spatial pitch of the array of light sources 60, this translates into an angular pitch $\theta_p$:

$$\theta_p = A \cdot p$$

The angular blur (diffusion) $\Phi_{diff}$ of the optical system 100 must be greater than this angular pitch in order to create the desired overlap between spotlights of neighbouring light sources 60 in the array:

$$\Phi_{diff} > A \cdot p$$

Note that this clearly links the spatial pitch p of the array of light sources 60 to the required diffusion. The angular blur of the optical system 100 is determined by its constituent optical elements, e.g. refractive lenses 110, 120, 130 and by the size (dimension) of the light sources 60, as larger pixel sizes result in larger blur as will be readily understood by the skilled person.

Figure 10:
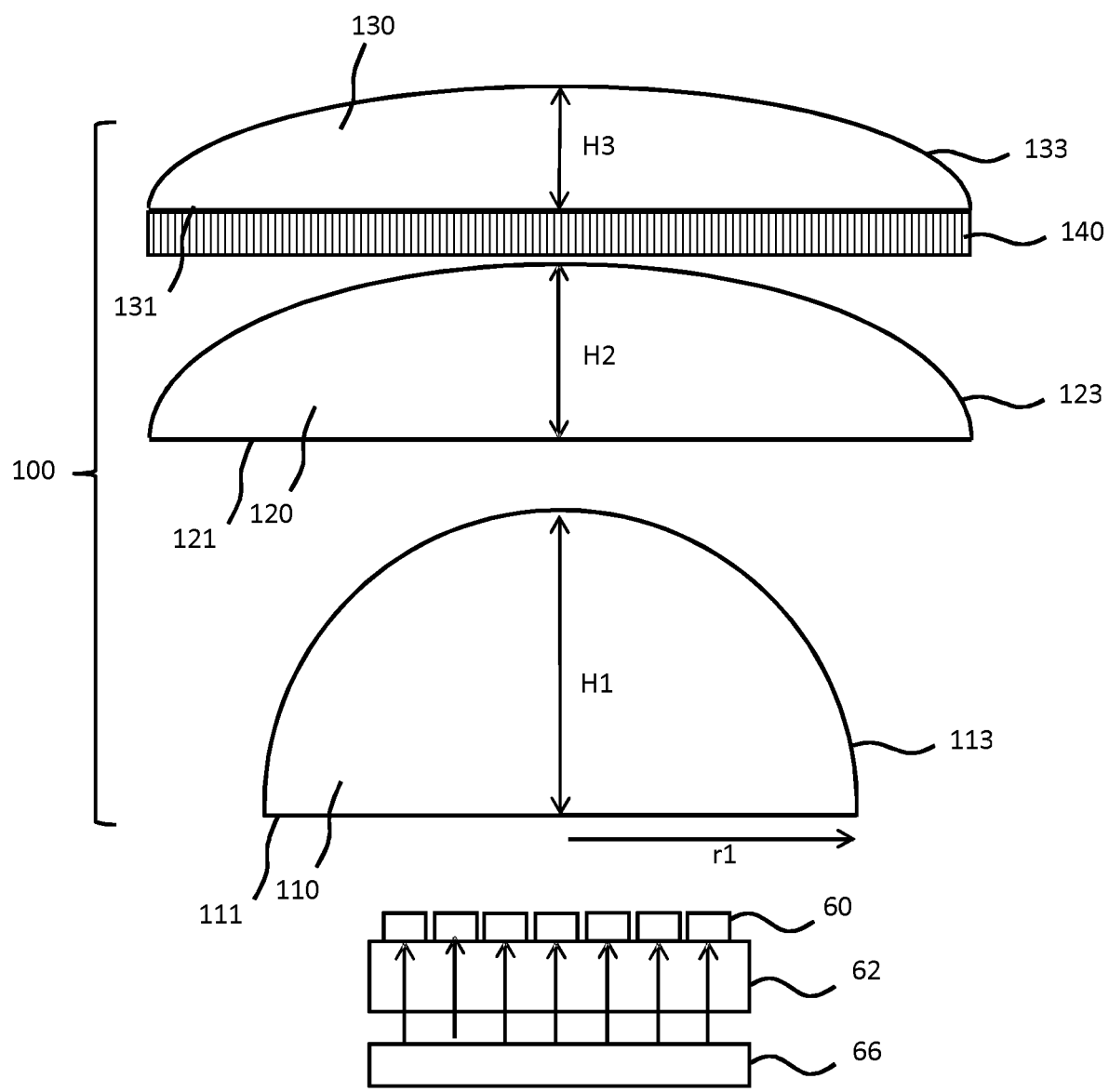
FIG. 10 schematically depicts a further example configurable light source arrangement suitable for inclusion in lighting systems in accordance with one or more embodiments.

The optical system 100 may comprise one or more elements for introducing additional blurring of the respective luminous distributions of the light sources 60 imaged by the optical system 100. For example, at least some of the light entry surfaces and light exit surfaces of the respective refractive lenses 110, 120, 130 may be structured, e.g. faceted or textured, in order to introduce such blurring into the optical system 100. Alternatively, as schematically depicted in FIG. 10, the optical system 100 may include a diffuser 140, here positioned in between the first further refractive lens 120 and the second further refractive lens 130 to introduce such blurring. It should be understood that such a diffuser 140 may be positioned in any suitable location within the optical system 100, e.g. in between the first refractive lens 110 and the first further refractive lens 120 or downstream from the second further refractive lens 130. Any suitable diffuser 140 may be used for this purpose. The optical system 100 may comprise multiple diffusers 140, each of which may be positioned in any suitable location downstream from the first refractive lens 110 as explained above. For the sake of completeness, it will be readily understood that the term 'downstream' is used in relation to the direction of the light emitted by the light sources 60, i.e. it equates to 'at increased distance from the light sources 60'.

Figure 11:
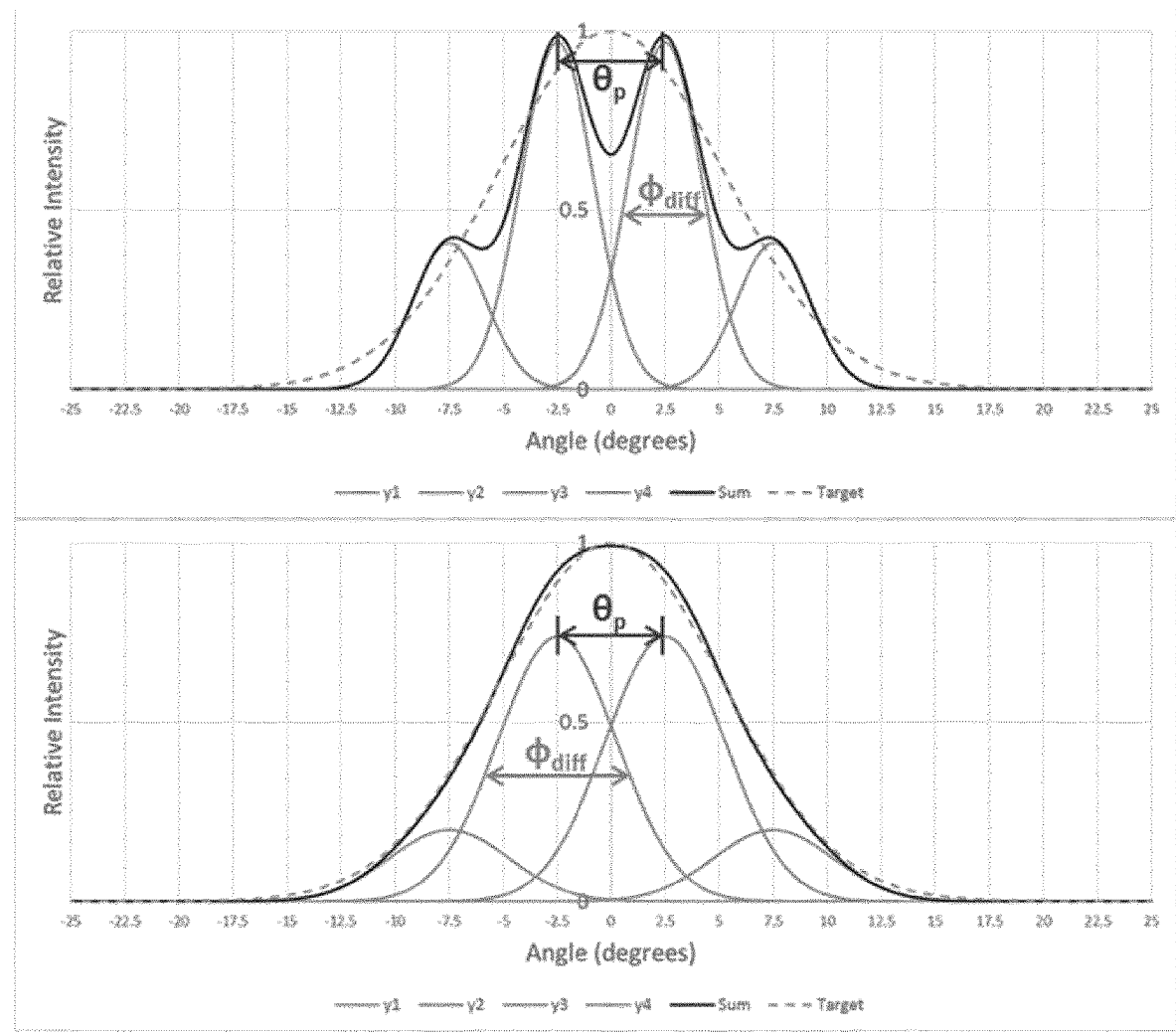
FIG. 11 graphically depicts the optical effect of the diffuser in the configurable light source arrangement of FIG. 10.

The effect of such blurring as introduced by one or more structured surfaces is schematically depicted in FIG. 11, which depicts a 2D case with four angular light sources 60 with an angular pitch 5° without additional blurring measures (top pane) and with additional blurring measures (bottom pane) in the optical system 100. As can be seen in the top pane, the angular diffusion $\Phi_{diff}$ of the optical system 100 is insufficient to create an effective envelope around the peak luminous intensities of the individual spotlights such that switching between these spotlights is seen as discrete movement. By contrast, the increased angular diffusion $\Phi_{diff}$ of the optical system 100 in the bottom pane introduced by the blurring measures make the individual components or pixels indistinguishable, such that switching between neighbouring spotlights is observed as a continuous movement. Similarly, as previously explained, such blurring also ensures that a spotlight formed by multiple spatially separated light sources 60 has a homogeneous appearance, which for example facilitates seamless zooming of the spotlight by changing the number of light sources 60 enabled to form the spotlight, e.g. by disabling or enabling light sources 60 defining the periphery of the spotlight.

The above described light source arrangement is hence applicable in embodiments of the invention to provide a highly adaptable and efficient spot beam projection, wherein movement of the spot beam across a projection space can effected extremely smoothly through implementation of the angular blur considerations detailed above. As will be recognised, the capacity to generate highly precise spot beams having a wide field of directionality and being rapidly adjustable renders the above light source arrangement particularly suited for implementing for instance the example embodiments depicted in FIGS. 2 and 4.

In accordance with one or more embodiments of the invention, the configurable light source arrangement may be configured to generate a light effect which is at least partially formed by a coded light output. By 'coded light output' is meant a light output being spatially (or temporally) patterned so as to encode information. The information may be decoded in examples by means of a suitable code capturing device. This may be implemented for instance using a smart device such as a smartphone being equipped with a camera for imaging the coded light output, and having an appropriate app installed for decoding the imaged pattern. Where the light output is spatially patterned, capturing the code may consist for instance in capturing an image of the light output when projected onto an incident surface of the space (e.g. an area on the floor).

The information contained in the code may include for instance a promotion web link, or information on products or special offers available in a particular shop, as well as vouchers or coupons for use in a nearby shop.

In accordance with one or more embodiments, the lighting system 10 may additionally comprise means for identifying or categorising individuals located within a detection area of the presence detector 14. The means may comprise for example a camera device being linked with associated software for recognising individuals (for instance regular shoppers), or for identifying certain characteristics of a person (e.g. gender, age, or certain facial gestures, such as a look of enthusiasm). The thus determined identification or characteristics of the detected individual may then be utilised in determining for instance an appropriate location of interest 36 toward which to direct the individual's attention (e.g. a particular product most likely to interest them), or a suitable light effect to create to most effectively attract their attention. For instance, one light effect may be more effective for older shoppers and a different light effect more effective for younger shoppers.

Additionally or alternatively, the lighting system may utilise the identification or determined characteristics to make an initial determination as to whether any light effect should be created. For instance only regular or known shoppers may be provided with the light effect, or only shoppers of a particular category (e.g. a particular age range falling within the target market of a given shop).

As noted above, light effect created by the lighting system may include both static and dynamic light effects. In accordance with one or more embodiments, in addition to a primary light effect, for instance in accordance with the examples described above, the light effect may also include synchronously flashing light spots at each of said first location 34 and said defined location 36 so as to associate the two locations and attract the attention of an individual from the first location toward the defined location 36. The flashing lights create a temporal association between the two locations, thereby further encouraging an individual to direct their attention toward the defined location 36. The synchronously flashing lights may be provided simultaneously for instance with the sweeping beam light effect illustrated in FIG. 2.

The invention has in the above disclosure been described primarily in the context of implementation within a retail environment. However, embodiments of the invention have broad applicability across a range of different environments. These include, but are by no means limited to, application within a theatre or a stadium, within a cinema, within a museum or art exhibition, within a public square or space, or even on a road, for instance to direct attention to an upcoming sharp turn, or hazard in the road.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting system adapted to generate a configurable spotlight effect, comprising:
    a configurable light source arrangement for generating the configurable spotlight effect;
    a presence detector for detecting motion of an individual at a detection location within a detection area, and for detecting in which direction the individual is moving; and
    a controller adapted to configure the configurable light source arrangement in response to said presence detector, wherein the controller is adapted to determine a first location in front of the individual based on the direction of the individual, and to generate the configurable spotlight effect with the configurable light source arrangement from the first location towards a defined location such as to attract the attention of said individual to the defined location.

2. A lighting system as claimed in claim 1, further comprising a gaze detection means, and wherein the controller is configured to
    control the gaze detection means to identify a field of view of said individual; and
    generate said light effect such that said first location is within said determined field of view.

3. A lighting system as claimed in claim 1, wherein the controller is configured to generate said light effect such that said first location is a preset distance away from said detection location.

4. A lighting system as claimed in claim 1, wherein the presence detector is a position tracker for tracking a changing location of an individual within said detection area.

5. A lighting system as claimed in claim 4, wherein the controller is further adapted to recurrently reconfigure the controllable light source arrangement in response to the changing location.

6. A lighting system as claimed in claim 1, wherein the configurable light source arrangement comprises an array of individually addressable LEDs, each arranged to produce a luminous output, and a lens arrangement common to said individually addressable LEDs, wherein the lens arrangement redirects the luminous outputs of said LEDs as a function of their position within the array.

7. A lighting system as claimed in claim 1, wherein the configurable light source arrangement comprises:
- a planar array of individually addressable sets of light sources, each set comprising at least one light source, each of said light sources being arranged to produce a luminous output; and
- an optical system comprising a plurality of refractive lenses common to the individually addressable light sources and sequentially arranged along a common optical axis to shape the luminous output of each set of light sources into a spotlight and project said spotlight in an angular direction that is a function of a position of said set in the array.

8. A lighting system as claimed in claim 7, wherein the optical system is arranged such that a respective angular deviation between projected spotlights generated from luminous outputs of different pairs of neighbouring light sources is the same for any such neighbouring pair across said planar array.

9. A lighting system as claimed in claim 7, wherein the plurality of refractive lenses comprises a first refractive lens arranged to receive the respective luminous outputs from the array and at least one further refractive lens arranged to receive the luminous output of the first refractive lens, said first refractive lens having a lens body at least partially delimited by a planar surface facing the array and a convex surface opposite the planar surface, said lens body having a maximum height normal to the planar surface of at least the radius of the planar surface.

10. A lighting system as claimed in claim 9, wherein the at least one further refractive lens comprises a first further refractive lens and a second further refractive lens arranged such that the first further refractive lens is positioned in between the first refractive lens and the second further refractive lens, each of the first further refractive lens and the second further refractive lens being a plano-convex lens having its planar surface facing the array.

11. A lighting system as claimed in claim 10, wherein the optical system further comprises a diffuser arranged downstream from the first refractive lens.

12. A lighting system as claimed in claim 1 wherein the light effect comprises:
- a static light pattern extending spatially from said first location toward said defined location; or
- a dynamic light effect comprising a spot beam controlled to move along a path from said first location toward said defined location.

13. A lighting system as claimed in claim 1, wherein said light effect is at least partially formed by a coded light output encoded with information.

14. A lighting system as claimed in claim 1, wherein said light effect includes light effect regions at each of said first location and said defined location, and wherein the light effect region at said first location is controlled to share one or more optical properties with the light effect region at said defined location so as to associate the two locations and attract the attention of an individual from the first location toward the defined location.

15. A method for generating a configurable spotlight effect, comprising:
- detecting the motion of an individual at a detection location within a detection area;
- detecting in which direction the individual is moving;
- determining a first location in front of the individual based on the direction of the individual; and
- in response to said detection, configuring a configurable light source arrangement to generate the configurable spotlight effect from the first location towards a defined location so as to attract the attention of said individual to the defined location.

* * * * *